Dec. 18, 1956  R. C. KIRK  2,774,663
PRODUCTION OF SODIUM
Filed Oct. 18, 1955
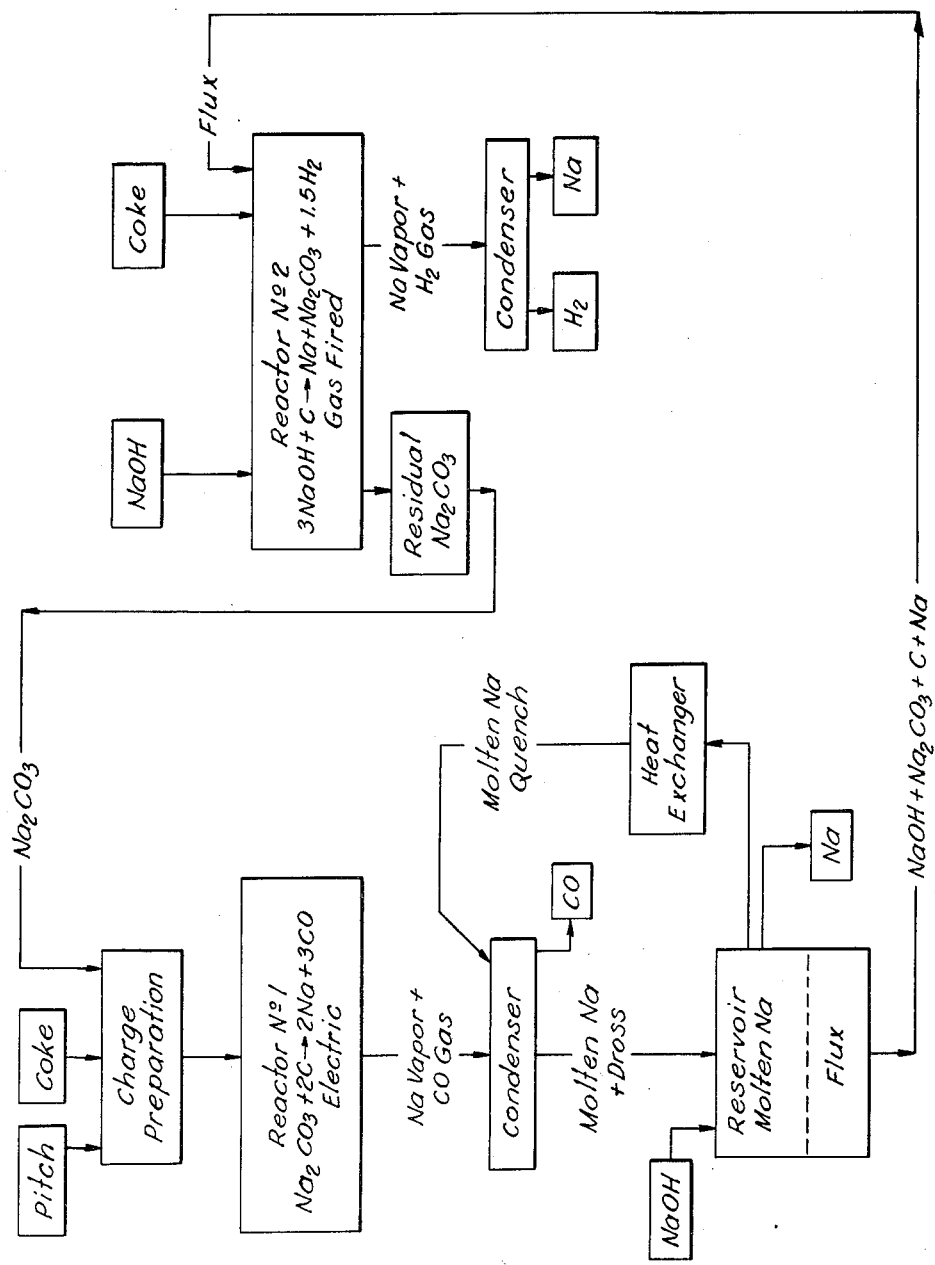
INVENTOR.
Roy C. Kirk
BY
Griswold & Burdick
ATTORNEYS

United States Patent Office 2,774,663
Patented Dec. 18, 1956

2,774,663

PRODUCTION OF SODIUM

Roy C. Kirk, Midland, Mich., assignor to The Dow Chemical Company, Midland, Mich., a corporation of Delaware Application October 18, 1955, Serial No. 541,274

5 Claims. (Cl. 75—66)

This invention relates to the production of sodium and, more particularly, to an improved process for producing sodium by means of a cyclical, thermal method.

A number of thermal processes for producing sodium have been known heretofore, but each proved to be uneconomical because of the low yields which were obtained. An improved thermal process has been disclosed and claimed in U. S. Patent No. 2,391,728, patented December 25, 1945, on an application filed in the names of Thomas H. McConica III, Arthur A. MacPhail and the applicant as co-inventors. In brief, this patented process comprises, as one example, charging sodium carbonate and carbon to a high temperature reactor in which the carbon reduces the sodium carbonate to obtain sodium vapor and carbon monoxide. These gases are then passed through a condenser in which they are rapidly chilled by intimate contact with molten lead to condense the sodium vapor to molten sodium and thus separate it from the carbon monoxide.

While this patented process represents a marked improvement over the prior art, still some dross is formed upon condensation of the sodium vapor. Such dross formation is inherent in any high temperature thermal production of sodium, since the sodium vapor and carbon monoxide will react to a limited extent (depending upon the rapidity of cooling) when they pass from the high reaction temperatures through the lower temperature ranges during condensation. The dross may be readily separated from the molten sodium by adding thereto sodium hydroxide as a flux, but the amount of sodium hydroxide required for this fluxing operation is approximately equal to the total weight of sodium recovered. Consequently, a large percentage of the sodium values added as raw materials is found in this flux. Separation of the components of the flux is not economically feasible. Due to the large sodium hydroxide content, this flux cannot be recycled through the high temperature reactor. At temperatures of 1200° C., at which this reactor operates, sodium hydroxide has a very high vapor pressure and reacts readily with the graphite lining employed in such reactors. Thus, the sodium values in the flux are lost, and the efficiency of the overall process suffers accordingly.

It is an object of this invention, therefore, to provide a cyclical process for producing sodium wherein substantially all of the sodium values are recovered from the dross obtained in the high temperature thermal production of sodium. Other objects of this invention will become apparent from the following detailed description thereof.

In practicing the process of the present invention, sodium carbonate is reduced with carbon in a high temperature reactor in the manner described above in connection with Patent No. 2,391,728. A charge of sodium carbonate and some suitable form of carbon such as coke, is fed to a reactor wherein the pressure and temperature are such as to produce sodium vapor and carbon monoxide. The sodium vapor and carbon monoxide are rapidly cooled in a condenser through intimate contact with a condensing medium such as molten sodium, molten lead or mixtures thereof. Some dross is inevitably formed during this condensation operation and is separated from the molten sodium by fluxing with sodium hydroxide.

In carrying out the cyclical process of the present invention, this flux, which is in the hot fluid state and contains the dross formed in the high temperature reactor, is heated along with added sodium hydroxide and carbon in a low temperature reactor to produce sodium vapor, hydrogen gas and residual sodium carbonate. The sodium vapor is separated from the hydrogen by passing it through a condenser such as a molten pool of sodium, and the residual sodium carbonate is removed from the low temperature reactor and recycled to the high temperature reactor to complete the cycle.

This process utilizes by-product waste from the high temperature thermal reaction in a second reaction to perform the two-fold function of recovering the sodium values therefrom and to regenerate starting material for the high temperature reaction. Consequently, the present invention still further improves the efficiency of the high temperature reduction of sodium carbonate. Furthermore, since the sodium values in the dross are almost entirely recovered, economical modifications of the sodium carbonate reduction process which previously could not be considered because of increased dross formation, can now be made. For example, substitution of a sodium quench for a lead quench, with the accompanying elimination of distillation operations, is economically feasible in spite of substantial increases in the amount of dross formed.

In describing the present invention in detail reference is made to the accompanying drawing which comprises a flow sheet outlining the one example of the subject process. A charge is made up for reactor No. 1 by combining pitch, coke, and sodium carbonate, in the form of briquettes.

While coke is a preferred source of carbon, some pitch is desired for use as a binder in the briquetting operation. By combining the carbon and sodium carbonate in intimate mixture in briquettes, the sodium carbonate reacts with this added carbon rather than with the graphite liner in the reactor. Also, briquetting provides the added function of reducing the fines which contribute materially to the amount of dross obtained in the condenser. A screw conveyor may be used to feed these briquettes to reactor No. 1 which, in this specific example, is an electric arc furnace having a graphite lining. This reactor is maintained at a temperature between 900° and 1500° C., preferably at least 1200° C. The pressure within the reactor must exceed that in the condenser in order to force the sodium vapor from the reactor into the condenser. A reactor pressure of approximately 0.5 atmosphere is preferred.

The sodium vapor and carbon monoxide gas produced in reactor No. 1, are forced by the pressure within the reactor out through an orifice into the condenser, which is maintained at approximately 300° C. and at a low pressure of about one inch of mercury. Although the condenser may be constructed in various ways, one form comprises a series of curtains of molten sodium which intimately contact the sodium vapor to rapidly chill and condense it. The carbon monoxide is not condensed by the sodium quench, and is vented from the condenser in the gaseous state. As above mentioned, there is a certain amount of reversion of the sodium vapor and carbon monoxide gas to produce sodium carbonate. This carbonate, along with carbon, oxides, and unreacted charge become intermixed with the molten sodium to produce dross. This dross passes with the molten sodium into a reservoir where flake sodium hydroxide is added to flux the dross from the sodium. The temperature of the sodium in the reservoir must be within the range of 290° C. to 500° C. in order to prevent reaction with the sodium hydroxide. The freed sodium is then drawn off at a predetermined rate, part of it being recirculated through a heat exchanger for use as a quenching medium and the remainder being separated as the end product. The hot fluid flux, which consists principally of sodium hydroxide and sodium carbonate, along with some unreacted carbon and occluded sodium, is drawn off from the bottom of the reservoir.

Up to this point, the flow sheet process is quite similar to the process disclosed in Patent No. 2,391,728. The primary difference is that the patent discloses the use of a lead quench rather than a sodium quench, which requires a still for recovering hte molten sodium from the molten lead. Of course, the lead quench can be used in the present process, although one of the advantages of the instant process is that a sodium quench, which produces more dross than the lead quench, can be economically employed. Sodium recovery from the dross is a must with the use of a sodium quench, not only because of increased amounts of dross, but also because the metal values contained therein are entirely sodium.

The hot fluid flux which has been drawn off from the reservoir can be fed while still in the fluid state, to reactor No. 2 along with added sodium hydroxide and coke.

A major advantage of the present invention resides in using this flux while still in the hot fluid state, since the flux is then free from water and is at a temperature such that the heat requirements in the low temperature reactor are minimized. If the flux is allowed to cool and harden, the large sodium hydroxide content would cause it to take on additional water, which would have to be removed by an additional heating step before it could be introduced into reactor No. 2. Also, the hardened flux would have to be ground to a size which could be conveniently handled. Elimination of these added steps greatly enhances the commercial feasibility of the process.

The second reactor is maintained at a pressure of approximately one atmosphere and at temperatures ranging from 700 to 900° C., although 800–850° C. is preferred. Because of the relatively low temperatures involved, reactor No. 2 is preferably gas-fired. Upon reaction, sodium vapor, hydrogen, and residual sodium carbonate are produced. The sodium vapor and hydrogen gas are forced by the pressure within the reactor No. 2 into a condenser which is maintained at approximately 100° C. and at a pressure up to one atmosphere. This condenser may be just a pool of molten sodium through which the gases are bubbled. A heat exchanger can be used to cool the molten sodium, although heat losses may of themselves be sufficient to maintain a constant temperature. The hydrogen does not condense in the condenser, of course, and is removed through a suitable vent. The sodium vapor does condense and is collected as the end product. The residual carbonate left in the low temperature reactor No. 2 is not pure, and contains some unreacted carbon and sodium hydroxide. Still, it is adequate for use in the high temperature reactor and is removed from reactor No. 2 and combined with added coke and pitch to prepare the charge for reactor No. 1. In this manner, the cycle of the process is completed.

To better understand the significance of the applicant's invention, reference is made to a material balance of the process outlined in the accompanying flow sheet. As an example, two pounds of sodium carbonate and 0.45 pound of carbon (in the form of coke and pitch) fed to reactor No. 1 and treated with 0.70 pound of sodium hydroxide in the reservoir, as above described, produces 1.18 pounds carbon monoxide, 0.70 pound sodium, and 1.27 pounds of flux. When this 1.27 pounds of flux is combined with 1.0 pound of sodium hydroxide and 0.05 pound of carbon (in the form of coke) in reactor No. 2, it produces 0.4 pound of hydrogen, 0.28 pound of sodium, and 2.0 pounds of sodium carbonate. All that need be added to this cyclical operation to produce molten sodium is carbon and sodium hydroxide, which is normally cheaper than sodium carbonate. Neither of these reactions, by itself represents an efficient means for recovering sodium values from the charged materials, but the cyclical process comprising the present invention effects more than a 90 percent recovery of these sodium values.

It will be obvious to those skilled in the art that numerous variations in the process steps above set forth may be made without departing from the scope of the present invention. For example, the charge may be introduced into either reactor in a variety of ways, and any form will be satisfactory as long as intimate mixing of the charge ingredients is obtained and the fines are reduced to a minimum. Temperature and pressure variations in the reactors and in the condensers are interrelated and may be varied in a manner well known to those skilled in the art. Operational details, such as protective atmospheres, heat exchangers, etc. have not been extensively described since they form no part of the present invention, and their operation is familiar to those skilled in this art.

I claim:

1. In a process for producing sodium which comprises reducing sodium carbonate with carbon in a high temperature reactor to produce sodium vapor and carbon monoxide, condensing the sodium vapor to produce a mixture of molten sodium and a dross consisting principally of sodium carbonate and carbon, fluxing the dross from the molten sodium with sodium hydroxide and separating the flux from said molten sodium, the improvement which comprises the steps of heating said flux in a low temperature reactor along with added sodium hydroxide and carbon to produce sodium vapor, hydrogen and residual sodium carbonate, separating said sodium carbonate from the sodium vapor and hydrogen, and feeding said sodium carbonate and added carbon into the above-mentioned high temperature reactor to complete a cyclical process for making sodium.

2. In a process for producing sodium comprising reacting sodium carbonate with carbon in a high temperature reactor to produce sodium vapor and carbon monoxide, condensing the sodium vapor to produce a mixture of molten sodium and a dross consisting principally of sodium carbonate and carbon, fluxing the dross from the molten sodium by adding sodium hydroxide to said mixture and separating the molten sodium from the hot fluid flux, the improvement of converting this process to a cyclical operation which comprises the steps of reacting the hot fluid flux in a low temperature reactor along with added sodium hydroxide and carbon to produce sodium vapor, hydrogen, and residual sodium carbonate, separating the residual sodium carbonate from the sodium vapor and hydrogen, and feeding said residual sodium carbonate along with added carbon to the aforesaid high temperature reactor to produce more sodium vapor and dross and thus complete the cycle.

3. In a process for producing sodium comprising reacting sodium carbonate with carbon in a high temperature reactor to produce sodium vapor and carbon monoxide, condensing the sodium vapor with a molten sodium quench to produce a mixture of molten sodium and substantial amounts of dross consisting principally of sodium carbonate, carbon and occluded sodium, fluxing the dross from the molten sodium by adding sodium hydroxide to said mixture and separating the molten sodium from the flux, the improvement of converting this process to a cyclical operation which comprises the steps of reacting the flux while still in a hot fluid state in a low temperature reactor along with added sodium hydroxide and carbon to produce sodium vapor, hydrogen, and residual sodium carbonate, separating the residual sodium carbonate from the sodium vapor and hydrogen, and feeding said residual sodium carbonate along with added carbon to the aforesaid high temperature reactor to produce more sodium vapor and dross and thus complete the cycle.

4. In a process for making sodium comprising reacting sodium carbonate with carbon in a high temperature reactor to produce sodium vapor and carbon monoxide, condensing the sodium vapor to produce a mixture of molten sodium and a dross consisting principally of sodium carbonate and carbon, fluxing the dross from the molten sodium by adding sodium hydroxide to said mixture and separating the molten sodium from the flux, the improvement of converting this process to a cyclical operation which comprises the steps of reacting the hot flux while still in the hot fluid state in a low temperature reactor along with added sodium hydroxide and carbon to produce sodium vapor, hydrogen, and residual sodium carbonate, separating the resiual sodium carbonate from the sodium vapor and hydrogen, and feeding said residual sodium carbonate along with added carbon to the aforesaid high temperature reactor to produce more sodium vapor and dross and thus complete the cycle, the amount of sodium hydroxide and carbon reacted in said low temperature reactor being such that a predetermined amount of residual sodium carbonate is continuously produced and supplied to the high temperature reactor.

5. In a process for making sodium comprising reacting sodium carbonate with carbon in a high temperature reactor maintained at a temperature of at least 1200° C. and not more than 1500° C. to produce sodium vapor and carbon monoxide, condensing the sodium vapor with molten sodium to produce a mixture of molten sodium at temperatures between 290° C. and 500° C. and a substantial amount of dross consisting principally of sodium carbonate, carbon, and occluded sodium, fluxing the dross from the molten sodium by adding sodium hydroxide to said mixture and separating the molten sodium from the hot fluid flux, the improvement of converting this process to a cyclical operation which comprises the steps of reacting the flux while still hot and fluid in a low temperature reactor at a temperature ranging from 700 to 900° C. along with added sodium hydroxide and carbon to produce sodium vapor, hydrogen, and residual sodium carbonate, separating the residual sodium carbonate from the sodium vapor and hydrogen, and feeding said residual sodium carbonate along with added carbon to the aforesaid high temperature reactor to produce more sodium vapor and dross and thus complete the cycle, the amount of sodium hydroxide and carbon reacted in said low temperature reactor being such that the residual sodium carbonate is continuously produced at a predetermined rate and supplied to the high temperature reactor.

References Cited in the file of this patent
UNITED STATES PATENTS
2,391,728     McConica et al. _____ Dec. 25, 1945